United States Patent [19]
Holt et al.

[11] 3,893,972
[45] July 8, 1975

[54] ACYL HYDRAZONES OF 2,2,6,6-TETRAMETHYLPIPERIDINE-4-ONES

[75] Inventors: Brian Holt, Royton; Donald Richard Randell, Stockport; James Jack, Bramhall, all of England

[73] Assignee: Ciba-Geigy Corporation, Ardsley, N.Y.

[22] Filed: Jan. 25, 1974

[21] Appl. No.: 436,554

Related U.S. Application Data
[62] Division of Ser. No. 182,181, Sept. 20, 1971, Pat. No. 3,828,052.

[30] Foreign Application Priority Data
Sept. 19, 1970 United Kingdom............... 44760/70

[52] U.S. Cl........................ 260/45.8 N; 260/293.62
[51] Int. Cl. ............................................. C08f 45/58
[58] Field of Search............................. 260/45.8 N

[56] References Cited
UNITED STATES PATENTS
3,745,163   7/1973   Holt et al...................... 260/45.8 N

*Primary Examiner*—Melvyn I. Marquis
*Attorney, Agent, or Firm*—Nestor W. Shust

[57] ABSTRACT

Acyl hydrazone derivatives of 2,2,6,6-tetramethylpiperidine-4-one are stabilizers of organic materials. They are prepared by reacting a corresponding acid hydrazide with triacetonamine.

14 Claims, No Drawings

ACYL HYDRAZONES OF 2,2,6,6-TETRAMETHYLPIPERIDINE-4-ONES

This is a division of application Ser. No. 182,181, filed on Sept. 20, 1971 now U.S. Pat. No. 3,828,052.

The present invention concerns a new class of acyl hydrazone derivatives of 2,2,6,6-tetramethylpiperidine-4-one having value as stabilisers for organic materials.

According to the present invention, there are provided compounds having the formula:

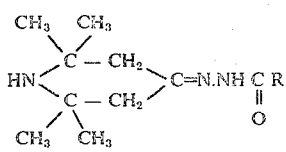

and their acid salts wherein R represents hydrogen, a straight- or branched-alkyl residue having from 1 to 20, preferably from 1 to 17 more preferred from 1 to 12 carbon atoms in which the alkyl chain may be uninterrupted or interrupted by one or more, preferably one, sulphur atom, a cycloalkyl residue having from 5 to 12, preferably 6, carbon atoms, a cycloalkyl alkyl residue having from 6 to 12, preferably 7 to 11, carbon atoms, a phenyl residue, a naphthyl residue, an aralkyl residue containing from 7 to 14, preferably 7 to 11, carbon atoms or an alkaryl residue preferably alkylphenyl having from 7 to 14, preferably 7 to 10, carbon atoms, or R represents the grouping of formula:

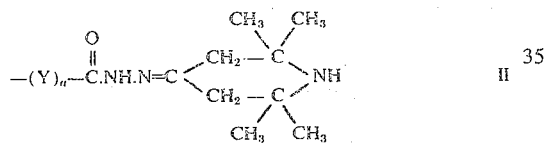

wherein Y is a divalent, straight- or branched-chain alkylene residue having from 1 to 20, preferably 1 to 10, more preferred 4 to 10 carbon atoms in which the alkylene chain is uninterrupted or interrupted by one or more, preferably one, sulphur atom, or an arylene residue having from 6 to 12, preferably 6, carbon atoms and $a$ is 0 or, preferably, 1, or R represents the grouping having the formula:

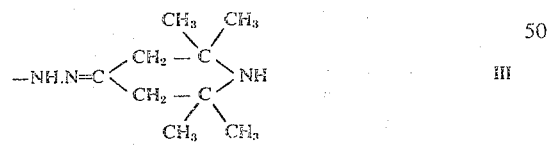

Examples of salts of piperidine derivatives (I) that can be used according to the invention include salts of an inorganic acid such as phosphates, carbonates, sulphates, chlorides and the like as well as organic acid salts such as citrates, acetates, stearates, maleates, oxalates and benzoates.

Examples of monovalent groups R are methyl, ethyl, n-propyl, isopropyl, n-butyl, t-butyl, n-amyl, 2-ethylpropyl, n-hexyl, n-heptyl, n-octyl, n-undecyl, n-dodecyl, n-heptadecyl, n-octadecyl, eicosyl, β-mercaptoethyl, mercaptomethyl, β-methylthioethyl, β-octylthioethyl, α- and β-dodecylthioethyl, cyclopentyl, cyclohexyl, methylcyclohexyl, 4-t-butylcyclohexyl, cyclododecyl, adamantyl, 1- and 2-perhydronaphthyl, cyclopentylmethyl, cyclohexylmethyl, β-cyclohexylethyl, 1- and 2-(perhydronaphthyl) methyl,β-[1- and 2- perhydro naphthyl]ethyl, benzyl, β-phenylethyl, 1- and 2-naphthylmethyl, β-[1- and 2-naphthyl]ethyl, diphenylmethyl, o-, m- and p-tolyl, o-, m- and p-ethylphenyl, o-, m- and p-isopropylphenyl, δ-, m- and p-t-butylphenyl, 4-methyl-1-naphthyl, 4-ethyl-1-naphthyl, 4-isopropyl-1-napthyl and 4-t-butyl-1-napthyl.

Examples of groups Y are methylene, 1,2-ethylene, 1,4-n-butylene, 1,8-n-octylene, n-undecyl, n-decylene, 1,2-eicosylene, 1,2-, 1,3- and 1,4-phenylene, 1,4- and 1,5-naphthylene, 4,4'-diphenylene and the group —$CH_2CH_2SCH_2CH_2$—.

Particularly preferred groups R are hydrogen, methyl, isopropyl, 3-methylbutyl, n-hexyl, 2-ethylpentyl, n-undeyl, n-heptadecyl, phenyl, p-tolyl, p-t-butyl phenyl, benzyl, diphenylmethyl, α-naphthyl, α-naphthylmethyl, cyclohexyl, and one of the groups having the formulae:

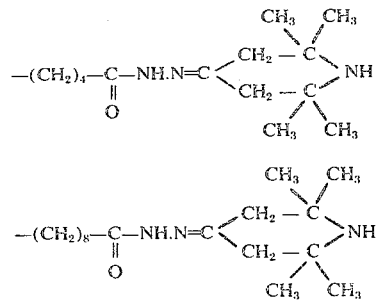

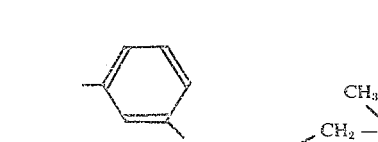

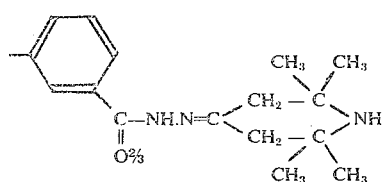

However for the stabilisation of polyolefines, compounds of formula I having a high ratio of organophilic residue to secondary amine function are the most preferred on compatibility grounds.

Specific examples of preferred compounds of formula I are:
di-(2,2,6,6-tetramethylpiperidinyl-4) adipoyl dihydrazone,
di-(2,2,6,6-tetramethylpiperidinyl-4) sebacoyl dihydrazone,
di-(2,2,6,6-tetramethylpiperidinyl-4) thiodipropionyl di-hydrazone,
2,2,6,6-tetramethylpiperidinyl-4- isocaproyl hydrazone, 2,2,6,6-tetramethylpiperidinyl-4-heptanoyl hydrazone,
2,2,6,6-tetramethylpiperidinyl-4- lauroyl hydrazone,
2,2,6,6-tetramethylpiperidinyl-4- stearoyl hydrazone,
2,2,6,6-tetramethylpiperidinyl-4- isobutyroyl hydrazone,
2,2,6,6-tetramethylpiperidinyl-4- benzoyl hydrazone,
2,2,6,6-tetramethylpiperidinyl-4- p-toluoyl hydrazone,
2,2,6,6-tetramethylpiperidinyl-4- α- naphthoyl hydrazone,
2,2,6,6-tetramethylpiperidinyl-4- phenylacetyl hydrazone,
2,2,6,6-tetramethylpiperidinyl-4-α- naphthylacetyl hydrazone,
2,2,6,6-tetramethylpiperidinyl-4- α, α- diphenylacetyl hydrazone,
2,2,6,6-tetramethylpiperidinyl-4- cyclohexane carboxyl hydrazone,
di-(2,2,6,6-tetramethylpiperidinyl-4) isophthaloyl di-hydrazone,
di-(2,2,6,6-tetramethylpiperidinyl-4) dodecane-1:10- dioyl di-hydrazone,
2,2,6,6-tetramethylpiperidinyl-4-p-t-butylbenzoyl hydrazone,
and 2,2,6,6-tetramethylpiperidinyl-4-2'-ethylhexanoyl hydrazone as well as the corresponding acid salts.

The present invention also provides a process in which the compound of formula I is produced comprising reacting an acid monohydrazide having the formula:

or an acid di-hydrazide having the formula:

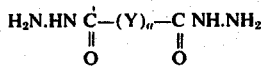

wherein R and Y have their previous significance, with triacetonamine having the formula:

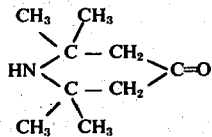

The reaction is conveniently effected by heating the reactants together in a solvent inert to the reactants, for instance an aliphatic alcohol, ether, or aromatic hydrocarbon, especially methanol or ethanol, diethyl ether or toluene. Advantageously the reaction is conducted at the reflux temperature of the mixture using substantially equimolar proportions of each reactant. On completion of the reaction, the solid product may be isolated, and purified if desired, by conventional techniques.

The present invention still further provides a composition comprising an organic material and a minor proportion of a compound having the formula I as hereinbefore defined.

Compounds of formula I have been found to impart to polyolefines an exceptionally high degree of stability towards deterioration normally induced by the effects of ultra-violet radiation. Moreover, this light stability is achieved without affecting the colour properties of the treated polyolefine. The stabilisers of the invention provide effective light and/or heat stabilisation especially for low- and high-density polyethylene and polypropylene and polystyrene as well as polymers of butene-1, pentene-1, 3-methylbutene-1, hexene-1, 4-methylpentene-1, 4-methylhexene-1 and 4,4,-dimethyl-pentene-dimethyl-pentene-1, as well as co- and ter-polymers of olefines, particularly of ethylene or propylene. The compounds of formula I are particularly effective in stabilising polystyrene against actinic radiation.

Other organic materials susceptible to degradation by the effects of light and the properties of which are improved by the incorporation therein of a compound of formula I include natural and synthetic polymeric materials, for instance natural and synthetic rubbers, the latter include, for example, homo-, co- and terpolymers of acrylonitrile, butadiene and styrene.

Specific synthetic polymers include polyvinyl chloride and vinyl chloride co-polymers, polyvinyl acetate and as well as condensation polymers derived from ether, ester (ex carboxylic, sulphonic or carbonic acids), amide or urethane groupings. These polymers can, for instance, form the basis of surface coating media such as paints and lacquers having an oil or resin, for instance an alkyd or polyamide resin, base.

The amount of the compound of formula I which is incorporated into the organic material in order to achieve maximal protection against degradation by light varies according to the properties of the organic material treated and according to the severity of the light radiation and to the length of exposure. However, for most purposes it is sufficient to use an amount of the compound of formula I within the range of from 0.01 to 5% by weight, more preferably within the range of from 0.1 to 2% by weight based on the weight of untreated organic material.

Optionally, the composition of the invention may contain further additives, especially those used in polyolefine formulations, such as antioxidants, further light stabilisers, metal complexants/deactivators, pigments, anti-slipping and anti-static agents, fillers, dyes and glass or other fibres.

The compounds of formula I may be incorporated into the polymeric material by any of the known techniques for compounding additives with a polymer. For example, the compound of formula I and the polymer may be compounded in an internal mixer. Alternatively, the compound of formula I may be added as a solution or slurry in a suitable solvent or dispersant, for instance an inert organic solvent such as methanol, ethanol or acetone to powdered polymer and the whole mixed intimately in a mixer, and the solvent subsequently removed. As a further alternative the compound of formula I may be added to the polymer during the preparation of the latter, for instance at the latex stage of polymer production, to provide pre-stabilised polymer material.

Examples of suitable antioxidants are those of the hindered phenol type such as 2,6-di-tertiarybutyl-p-cresol, 4,4'-bis(2,6-di-tertiarybutyl-phenol), 4,4'-bis(2,6-di-isopropylphenol), 2,4,6-triisopropyl phenol, and 2,2'-thio-bis(4-methyl-6-tertiarybutylphenol) tetrakis [methtylene-3(3',5'-dibutyl-4'-hydroxyphenyl) propionate] methane; esters of thiodipropionic acid, for example dilauryl thiodipropionate; alkyl, aryl or alkaryl phosphites such as triphenyl phosphite, trinonyl phosphite and diphenyldecyl phosphite, and combinations of these antioxidants.

Further light stabilisers include those of the substituted benzotriazole class such as 2-(2'-hydroxy-5'-methyl) phenylbenzotriazole, 2-(2'-hydroxy-3',5', -di-t-butyl)-5-chlorophenylbenzotriazole; those of the hydroxy benzophenone type; hindered phenols such as 2',4'-di-t-butylphenyl -3,5-di-t-butyl-4-hydroxy benzoate and the stabilisers described in our copending British Pat. Application Nos. 18090/70 and 28063/70 and suitable metal complexants/deactivators include salicylidene-propylene diamine, 5,5'-methylene-bis-benzotriazole and salts of salicylaminoquanidine.

As with the compound of formula I, any further additive is advantageously employed in a proportion within the range of from 0.01 to 5% by weight, based on the weight of untreated organic materials.

In combination with an antioxidant suitable for use in inhibiting oxidative deterioration of polyolefines, for instance those of the hindered phenol type, the compounds of formula I provide extremely effective all round stabilising packages for polyolefines, especially polystyrene.

Some Examples will now be given. Parts and percentages shown therein are by weight unless otherwise stated.

EXAMPLE 1

A mixture of 17.4 parts of adipic acid dihydrazide and 31 parts of triacetonamine in 150 parts of methanol was heated under reflux conditions for 12 hours. On removal of the methanol by distillation under reduced pressure, a white solid was left which was recrystallised from ethanol to give 42 parts of di-(2,2,6,6-tetramethylpiperidinyl-4) adipoyl-di-hydrazone as a white solid. This product had a melting point of 212°C and the following elemental analysis by weight:

|  | Found | Calculated (for $C_{24}H_{44}N_6O_2$) |
|---|---|---|
| Carbon | 64.03 | 64.22 |
| Hydrogen | 9.90 | 9.89 |
| Nitrogen | 18.85 | 18.74 |

EXAMPLE 2

The procedure described in Example 1 was followed except that the adipic acid dihydrazide was replaced by 23 parts of sebacic acid dihydrazide.

In this way, there were produced 25 parts of di-(2,2,6,6-tetramethylpiperidinyl-4) sebacoyl di-hydrazone having melting-point of 195° to 197°C and the following elemental analysis by weight:

|  | Found | Calculated (for $C_{28}H_{52}N_6O_2$) |
|---|---|---|
| Carbon | 66.87 | 66.62 |
| Hydrogen | 10.56 | 10.39 |
| Nitrogen | 16.51 | 16.66 |

EXAMPLE 3

The procedure described in Example 1 was followed, but the adipic acid dihydrazide was replaced by 20.6 parts thiodipropionic acid dihydrazide.

In this way, there were produced 20.3 parts of di-(2,2,6,6-tetramethylpiperidinyl-4) thiopropionyl di-hydrazone having melting range of 192° to 195°C and the following elemental analysis by weight:

|  | Found | Calculated (for $C_{24}H_{44}N_6O_2S$) |
|---|---|---|
| Carbon | 57.35 | 59.98 |
| Hydrogen | 9.29 | 9.23 |
| Nitrogen | 17.34 | 17.50 |
| Sulphur | 6.86 | 6.66 |

EXAMPLE 4

A mixture of 7.4 parts of acetic acid hydrazide and 15.5 parts of triacetonamine in 80 parts of methanol was heated under reflux conditions for 12 hours. On removal of the methanol by distillation under reduced pressure, a white solid was left which was recrystallised from ethyl acetate to give 16.5 parts of 2,2,6,6-tetramethylpiperidinyl-4-acetyl hydrazone as a white solid having a melting point of 149°–150°C and the following elemental analysis by weight:

|  | Found | Calculated (for $C_{11}H_{21}N_3O$) |
|---|---|---|
| Carbon | 62.99 | 62.56 |
| Hydrogen | 10.34 | 9.95 |
| Nitrogen | 19.95 | 19.91 |

EXAMPLE 5

A mixture of 21.6 parts of heptanoic acid hydrazide and 23.25 parts of triacetonamine in 150 parts of methanol was heated under reflux conditions for 24 hours. On removal of the methanol by distillation under reduced pressure, a white solid was left which was recrystallised from absolute ethyl alcohol to give 21 parts of 2,2,6,6 tetramethyl-4- heptanoyl hydrazone having a melting point of 69°–71°C and the following elemental analysis by weight:

|  | Found | Calculated (for $C_{16}H_{31}N_3O$) |
|---|---|---|
| Carbon | 68.40 | 68.30 |
| Hydrogen | 10.83 | 11.05 |
| Nitrogen | 14.66 | 14.95 |

EXAMPLE 6

A mixture of 27.0 parts of lauric acid hydrazide and 18.3 parts of triacetonamine in 300 parts of methanol was heated under reflux conditions for 12 hours. On removal of the methanol by distillation under reduced pressure a white waxy solid remained. This solid was dissolved in ether and filtered to remove trace quantities of the lauric acid hydrazide, the ether was removed by distillation under reduced pressure to give 2,2,6,6-tetramethylpiperidinyl-4-lauroyl hydrazone having the following elemental analysis by weight:

|          | Found  | Calculated (for $C_{21}H_{41}N_3O$) |
|----------|--------|-------------------------------------|
| Carbon   | 72.18  | 71.74                               |
| Hydrogen | 11.80  | 11.75                               |
| Nitrogen | 11.76  | 11.95                               |

EXAMPLE 7

A mixture of 2.98 parts of stearic acid hydrazide and 2.33 parts of triacetonamine were heated under reflux in 100 parts of toluene for 36 hours, the water formed in the reaction being removed using a Dean and Stark apparatus. On removal of the toluene by distillation under reduced pressure, a white solid was left which was recrystallised from methanol to give 1.10 parts of 2,2,6,6-tetramethylpiperidinyl-4-stearoyl hydrazone having a melting point of 72°–3°C and the following elemental analysis by weight:

|          | Found  | Calculated (for $C_{27}H_{53}N_3O$) |
|----------|--------|-------------------------------------|
| Carbon   | 74.46  | 74.50                               |
| Hydrogen | 12.18  | 12.20                               |
| Nitrogen | 9.58   | 9.64                                |

EXAMPLE 8

A mixture of 11.0 parts of dodecane-1:10 dioic acid dihydrazide and 12.24 parts of triacetonamine in 600 parts of methanol was heated under reflux conditions for 12 hours. On cooling a small amount of a white solid crystallised out which was collected by filtration and shown to be starting hydrazide, the methanol was removed by distillation under reduced pressure to yield a white solid which was recrystallised from ethyl acetate to give 5.70 parts of di-(2,2,6,6-tetramethylpiperidinyl-4) dodecane-1:10-dioyl-di-hydrazone having a melting point of 166°–7°C and the following elemental analysis by weight.

|          | Found  | Calculated (for $C_{30}H_{58}N_6O_2$) |
|----------|--------|---------------------------------------|
| Carbon   | 67.66  | 67.62                                 |
| Hydrogen | 10.69  | 10.59                                 |
| Nitrogen | 15.52  | 15.78                                 |

EXAMPLE 9

A mixture of 20.4 parts of isobutyric acid hydrazide and 81.0 parts of triacetonamine in 150 parts of methanol was heated under reflux conditions for 24 hours. On cooling the solution a white solid crystallised out which was collected by filtration and then recrystallised from methanol to give 25.2 parts of 2,2,6,6,-tetramethylpiperidinyl-4- isobutyroyl hydrazone as white needles having a melting point of 164°–5°C and the following elemental analysis by weight.

|          | Found  | Calculated (for $C_{13}H_{25}N_3O$) |
|----------|--------|-------------------------------------|
| Carbon   | 65.42  | 65.20                               |
| Hydrogen | 10.64  | 10.45                               |
| Nitrogen | 17.37  | 17.55                               |

EXAMPLE 10

A mixture of 13.6 parts of benzoic acid hydrazide and 15.5 parts of triacetonamine in 100 parts of methanol was heated under reflux conditions for 20 hours. On removal of methanol by distillation under reduced pressure, a white solid was left which was recrystallised from 100°–120°C petroleum ether to give 2,2,6,6-tetramethylpiperidinyl-4-benzoyl hydrazone having a melting point of 194°–5°C and the following elemental analysis by weight.

|          | Found  | Calculated (for $C_{16}H_{23}N_3O$) |
|----------|--------|-------------------------------------|
| Carbon   | 70.59  | 70.33                               |
| Hydrogen | 8.72   | 8.42                                |
| Nitrogen | 15.59  | 15.40                               |

EXAMPLE 11

A mixture of 24.9 parts of p-toluic acid hydrazide and 31.0 parts of triacetonamine in 500 parts of ethanol was heated under reflux conditions for 24 hours. On removal of the ethanol by distillation under reduced pressure, a white solid was left which was recrystallised from 100°–120°C petroleum ether to give 20.6 parts of 2,2,6,6-tetramethylpiperidinyl-4- p-toluoyl hydrazone having a melting point of 187°–8°C with decomposition and the following elemental analysis by weight.

|          | Found  | Calculated (for $C_{17}H_{25}N_3O$) |
|----------|--------|-------------------------------------|
| Carbon   | 70.92  | 71.05                               |
| Hydrogen | 8.56   | 8.77                                |
| Nitrogen | 14.82  | 14.62                               |

EXAMPLE 12

A mixture of 9.70 parts of isophthalic acid hydrazide and 31.0 parts of triacetonamine in 100 parts of methanol was heated under reflux conditions for 24 hours. On cooling a white solid crystallised from the solution, which was collected by filtration, and recrystallised from methanol to give 10.0 parts of di-(2,2,6,6-tetramethylpiperidinyl-4) isophthaloyl-di-hydrazone having a melting point of 240°–1°C with decomposition and the following elemental analysis by weight.

|          | Found  | Calculated (for $C_{26}H_{40}N_6O_2$) |
|----------|--------|---------------------------------------|
| Carbon   | 66.52  | 66.80                                 |
| Hydrogen | 8.69   | 8.50                                  |
| Nitrogen | 17.70  | 17.90                                 |

EXAMPLE 13

A mixture of 18.80 parts of α-naphthoic acid hydrazide and 23.0 parts of triacetonamine in 300 parts of methanol was heated under reflux conditions for 24 hours. On removal of the methanol by distillation under reduced pressure, a white solid was left, which was washed three times with ether and recrystallised from ethyl alcohol to give 16.70 parts of 2,2,6,6- tetramethylpiperidinyl-4-α-naphthoyl hydrazone as a white solid having a melting point of 210°–11°C and the following elemental analysis by weight.

|  | Found | Calculated (for $C_{20}H_{25}N_3O$) |
|---|---|---|
| Carbon | 74.67 | 74.27 |
| Hydrogen | 8.04 | 7.79 |
| Nitrogen | 12.98 | 12.99 |

EXAMPLE 14

A mixture of 22.40 parts of phenylacetic acid hydrazide and 31.0 parts of triacetonamine in 500 parts of ethanol was heated under reflux conditions ffor 24 hours. On removal of the ethanol by distillation under reduced pressure, a white solid was left which was recrystallised from acetone to give 32.80 parts of 2,2,6,6-tetramethylpiperidinyl-4-phenylacetyl hydrazone having a melting point of 158°–9°C and the following elemental analysis by weight.

|  | Found | Calculated (for $C_{17}H_{25}N_3O$) |
|---|---|---|
| Carbon | 71.23 | 71.05 |
| Hydrogen | 8.83 | 8.77 |
| Nitrogen | 14.80 | 14.62 |

EXAMPLE 15

A mixture of 10.0 parts of α-naphthylacetic acid hydrazide and 11.62 parts of triacetonamine in 150 parts of methanol was heated under reflux conditions for 24 hours. On removal of the methanol by distillation under reduced pressure, a white solid was left which was recrystallised from acetone to give 11.20 parts of 2,2,6,6-tetramethylpiperidinyl-4- α-naphthyl-acetyl hydrazone having a melting point of 196°–7°C and the following elemental analysis by weight.

|  | Found | Calculated (for $C_{21}H_{27}N_3O$) |
|---|---|---|
| Carbon | 74.51 | 74.72 |
| Hydrogen | 7.99 | 8.06 |
| Nitrogen | 12.39 | 12.46 |

EXAMPLE 16

A mixture of 4.53 parts of α,α-diphenylacetic acid hydrazide and 4.65 parts of triacetonamine in 75 parts of methanol was heated under reflux conditions for 24 hours. On cooling the solution a white solid separated out which was collected by filtration and recrystallised from methanol to give 1.50 parts of 2,2,6,6-tetramethylpiperidinyl-4- α, α-diphenylacetyl hydrazone having a melting point of 216°–17°C and the following elemental analysis by weight.

|  | Found | Calculated (for $C_{23}H_{29}N_3O$) |
|---|---|---|
| Carbon | 75.60 | 76.00 |
| Hydrogen | 8.06 | 8.04 |
| Nitrogen | 11.78 | 11.56 |

EXAMPLE 17

A mixture of 9.90 parts of cyclohexane carboxylic acid hydrazide and 10.85 parts of triacetonamine in 150 parts of methanol was heated under reflux conditions for 24 hours. On removal of the methanol by distillation under reduced pressure, a white solid was left which was recrystallised from benzene to give 13.20 parts of 2,2,6,6-tetramethylpiperidinyl-4- cyclohexane carboxyl hydrazone as a white solid having a melting point of 194°–5°C and the following elemental analysis by weight.

|  | Found | Calculated (for $C_{16}H_{29}N_3O$) |
|---|---|---|
| Carbon | 69.35 | 69.10 |
| Hydrogen | 10.45 | 10.05 |
| Nitrogen | 15.19 | 15.10 |

EXAMPLE 18

A mixture of 6.80 parts of formic acid hydrazide and 23.0 parts of triacetonamine in 150 parts of methanol was heated under reflux conditions for 12 hours. On removal of the methanol by distillation under reduced pressure, a solid was left which was recrystallised from ethanol to give 2,2,6,6-tetramethylpiperidinyl-4- formyl hydrazone as a white solid having a melting point of 148°–50°C and the following elemental analysis by weight.

|  | Found | Calculated (for $C_{10}H_{19}N_3O$) |
|---|---|---|
| Carbon | 61.17 | 60.88 |
| Hydrogen | 9.99 | 9.71 |
| Nitrogen | 21.34 | 21.30 |

EXAMPLE 19

A mixture of 23.0 parts of isocaproic acid, 100 parts of methanol and 1.0 part of concentrated sulphuric acid were heated under reflux conditions for 18 hours. The solution was cooled and 11.0 parts of hydrazine hydrate were added and the solution refluxed for a further 24 hours. The solution was cooled and a small amount of a white crystalline solid was filtered off. To the filtrate was added 28.17 parts of triacetonamine and the solution was heated under reflux conditions for a further 24 hours. On removing the methanol by distillation under reduced pressure, a solid was left which was recrystallised from ethyl acetate to give 17.80 parts of 2,2,6,6- tetramethylpiperidinyl-4isocaproyl hydrazone as a white solid having a melting point of 128.5°–9.5°C and the following elemental analysis by weight.

|  | Found | Calculated (for $C_{15}H_{29}N_3O$) |
|---|---|---|
| Carbon | 67.80 | 67.40 |
| Hydrogen | 11.08 | 10.93 |
| Nitrogen | 15.94 | 15.71 |

EXAMPLES 20 and 21

100 parts of crystal polystyrene pellets were dry blended with 0.25 parts of the protective agents given in the Table, and the dry-blend was homogenized by extrusion. The resulting stabilized pellets were injection moulded to form plaques of 2 mm thickness.

The obtained plaques were exposed for 1000 h in a "Xenotest 150" apparatus and the resulting yellowing of the plaques was measured by determining the yellowness factor according to the following formula:

$$\text{Yellowness factor:} \quad \frac{\Delta T_{(420)} - \Delta T_{(680)}}{T_{(560)}} \cdot 100$$

wherein

ΔT represents the transmission losses at the wavelengths 420 and 680mμ respectively after an exposure of 1000 h in the Xenotest apparatus and wherein $T_{(560)}$ represents the transmission value of an unexposed sample at a wavelength of 560 mμ

Table —
Yellowness factor of crystal polystyrene plaques after 1000 h exposure in a Xenotest apparatus

| Ex. No. | yellowness factor | Additive |
|---|---|---|
| — | 16.8 | control |
| — | 5.6 | compound of Example 9 of British Patent 1196224 |
| — | 5.1 | compound of "Example No. 37" of German Offenlegungsschrift 1929928 |
| — | 3.4 | compound of Example No. 3 of British Patent 1,202,298 |
| 20 | 0.6 | (Ex. 2) of present invention |
| 21 | 1.0 | (Ex. 5) of present invention |

Similar results were obtained using the products of Examples 7, 8 and 10.

EXAMPLES 22 to 24

A 0.15% weight/volume solution of the product of Example 1 in acetone was made up and 40 parts by volume of this solution was added to 40 parts by weight of powdered polypropylene which was substantially free from stabilising additives. A further 60 parts by volume of acetone was then added to form a slurry which was hand mixed to ensure homogeneity. The solvent was then removed by evaporation in an oven maintained at 80°C.

14 parts by weight of the dried powder were weighed into a mould measuring 6 × 6 × 0.015 inch. The mould and polishing plate were then heated in the press under constant pressure for 5 minutes. A pressure of 20 tons per square inch was applied for one minute, cooling was commenced and pressure increased so that when the temperature reached 150°C. the pressure was 80 tons per square inch. Cooling was continued until the temperature of the mould reached 50°C and the mould was released from the press.

The moulded sheet so obtained was exposed to light irradiation in a fademeter device consisting of a circular bank of 28 alternate sunlight and blacklight lamps. The sunlight lamps were 2 feet long 20-watt fluorescent lamps and were characterised by having a peak emission of 3000 Angstrom units and blanklight lamps were 2 feet long 40-watt ultra-violet lamps and were characterised by having a peak emission of 3,500 Angstrom units. The samples were rotated concentrically about the bank of lamps so that the radiation therefrom was uniformly distributed over the moulded sheet.

The exposed sample was examined periodically and bent through 180°C and the time at which it snapped due to embrittlement was noted.

An oven ageing test was also carried out on strips (6.0 × 1.0 inch) of the moulded sheet in an air circulating oven maintained at 150°C. The time taken for the test strip to fail by cracking on flexing the sample through 180° was noted.

Similar tests were carried out on polypropylene samples containing, respectively, no stabiliser and the products of Examples 1, 2 and 3. The results achieved are set out in the following Table.

| Example | Additive | Time to embrittlement (hours) heat ageing test | Time to embrittlement (hours) light ageing test |
|---|---|---|---|
| — | None | 2 | 82 |
| 22 | di-(2,2,6,6-tetramethylpiperidinyl-4) adipoyl di-hydrazone | 34 | 93 |
| 23 | di-(2,2,6,6-tetramethylpiperidinyl-4) sebacoyl di-hydrazone | 5 | 119 |
| 24 | di(2,2,6,6-tetramethylpiperidinyl-4) thiopropionyl di-hydrazone | 7 | 263 |

EXAMPLE 25

A mixture of 31.20 parts of p-t-butylbenzoic acid hydrazide and 31.0 parts of triacetonamine in 500 parts of ethanol was heated under reflux conditions for 24 hours. On removal of the ethanol by distillation under pressure, a white solid was left, which was recrystallised twice from ethyl acetate to give 13.80 parts of 2,2,6,6-tetramethyl piperidinyl-4-p-t-butylbenzoyl hydrazone having a melting point of 165°–166°C. and the following elemental analysis by weight:

|  | Found | Calculated (for $C_{20}H_{31}N_3O$) |
|---|---|---|
| Carbon | 73.46 | 72.99 |
| Hydrogen | 9.54 | 9.46 |
| Nitrogen | 12.52 | 12.74 |

EXAMPLE 26

A mixture of 15.80 parts of 2-ethylhexanoic acid hydrazide and 23.0 parts of triacetonamine in 250 parts of methanol were heated under reflux conditions for 15 hours. On removing the methanol by distillation under reduced pressure a reddish oil was left which slowly solidified; two recrystallisations from ethanol gave 7.10 parts of 2,2,6,6-tetramethylpiperidinyl-4-2'-ethylhexanoyl hydrazone as a white solid having a melting point of 91°–93°C and the following elemental analysis by weight:

| | Found | Calculated (for $C_{17}H_{33}N_3O$) |
|---|---|---|
| Carbon | 69.42 | 69.11 |
| Hydrogen | 11.38 | 11.26 |
| Nitrogen | 14.02 | 14.22 |

We claim:

1. A composition comprising an organic material and from 0.01 to 5% by weight of a compound having the formula

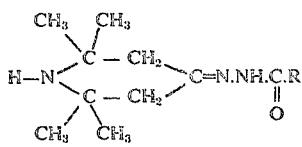

and their acid salts, wherein R represents hydrogen, a straight-or branched- alkyl residue having from 1 to 20 carbon atoms in which the alkyl chain may be uninterrupted or interrupted by one or more sulphur atom, a cycloalkyl residue having from 5 to 12 carbon atoms, a phenyl residue, a naphthyl residue, an arylalkyl residue containing from 7 to 14 carbon atoms or an alkylaryl residue having from 7 to 14 carbon atoms or R represents the grouping of formula

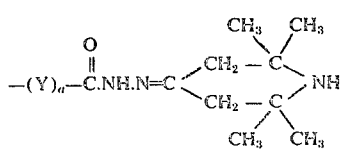

wherein Y is a divalent, straight- or branched chain alkylene residue having from 1 to 20 carbon atoms in which the alkylene chain is uninterrupted or interrupted by one or more sulfur atom, or an arylene residue having from 6 to 12 carbon atoms and $a$ is 0 or 1, or R represents the grouping having the formula:

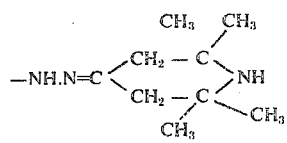

2. A composition as claimed in claim 1, wherein the organic material is a polyolefine.

3. A composition as claimed in claim 2, wherein the polyolefine is low- or high-density polyethylene or polypropylene.

4. A composition as claimed in claim 2, wherein the polyolefine is polystyrene.

5. A composition of claim 2 wherein R is alkyl of 1 to 12 carbon atoms and the alkyl chain is uninterrupted or interrupted by one or more sulphur atom.

6. A composition of claim 2 wherein R is

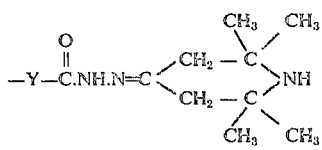

where Y is straight or branched chain alkylene having from 4 to 10 carbon atoms and the alkylene chain is uninterrupted or interrupted by one sulphur atom.

7. A composition of claim 1 wherein the stabilizer is di-(2,2,6,6-tetramethylpiperidinyl-4) thiopropionyl dihydrazone.

8. A composition of claim 1 wherein the stabilizer is 2,2,6,6-tetramethyl-4-heptanoyl hydrazone.

9. A composition of claim 1 wherein the stabilizer is 2,2,6,6-tetramethylpiperidinyl-4-lauroyl hydrazone.

10. A composition of claim 1 wherein the stabilizer is di-(2,2,6,6-tetramethylpiperidinyl-4) sebacoyl dihydrazone.

11. A composition of claim 1 wherein the stabilizer is di-(2,2,6,6-tetramethylpiperidinyl-4)adipoyl-dihydrazone.

12. A composition as claimed in claim 1, wherein the proportion of the compound of formula I is within the range of from 0.01% to 5% by weight based on the weight of untreated organic material.

13. A composition as claimed in claim 12, wherein the proportion of the compound of formula I is within the range of from 0.1% to 2% by weight based on the weight of untreated organic material.

14. A composition as claimed in claim 1, wherein an antioxidant, a further light stabiliser, a metal complexant/deactivator, a pigment, an anti-slipping or antistatic agent, a filler, a dye or glass or other fibres are present.

* * * * *